(12) United States Patent
Chu et al.

(10) Patent No.: US 11,006,416 B2
(45) Date of Patent: May 11, 2021

(54) OPERATION WITH BANDWIDTH-LIMITED DEVICES IN A WIRELESS NETWORK

(71) Applicant: Marvell World Trade Ltd., St. Michael (BB)

(72) Inventors: Liwen Chu, San Ramon, CA (US); Lei Wang, San Diego, CA (US); Hongyuan Zhang, Fremont, CA (US); Yakun Sun, San Jose, CA (US); Jinjing Jiang, San Jose, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/262,355

(22) Filed: Jan. 30, 2019

(65) Prior Publication Data
US 2019/0239226 A1    Aug. 1, 2019

Related U.S. Application Data

(60) Provisional application No. 62/624,642, filed on Jan. 31, 2018.

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/001* (2013.01); *H04L 5/0037* (2013.01);
(Continued)

(58) Field of Classification Search
None
See application file for complete search history.

(56) References Cited

U.S. PATENT DOCUMENTS 8,626,216 B2    1/2014    Higuchi et al.
8,699,442 B2    4/2014    Noh et al.
(Continued)

FOREIGN PATENT DOCUMENTS

WO    WO-2016/207837    12/2016

OTHER PUBLICATIONS

Chun et al., "Legacy Support on HEW frame structure," doc: IEEE 11-13/1057r0, *The Institute of Electrical and Electronics Engineers, Inc.*, pp. 1-8 (Sep. 2013).
(Continued)

*Primary Examiner* — Gregory B Sefcheck
*Assistant Examiner* — Amarnauth G Persaud

(57) ABSTRACT

A first communication device allocates respective portions of a communication channel, that includes at least one primary component channel and one or more non-primary component channels, to a plurality of second communication devices, including a bandwidth-limited second communication device configured to operate with a maximum bandwidth that is less than a full bandwidth of the communication channel. The bandwidth-limited second communication device is operating in a particular component channel, and allocation of a frequency portion to the bandwidth-limited second communication device is restricted to the particular component channel. The first communication device transmits a data unit that includes one or both of: respective data for the second communication devices in the respective frequency portions allocated to the respective second communication devices, and one or more trigger frames to prompt transmission of respective data by the second communication devices in the respective frequency portions allocated to the respective second communication devices.

14 Claims, 9 Drawing Sheets

(51) Int. Cl.
*H04L 29/08* (2006.01)
*H04W 74/06* (2009.01)
*H04W 84/12* (2009.01)

(52) U.S. Cl.
CPC ........... *H04L 69/323* (2013.01); *H04W 84/12* (2013.01); *H04L 5/0064* (2013.01); *H04W 72/048* (2013.01); *H04W 74/06* (2013.01)

(56) References Cited

U.S. PATENT DOCUMENTS

| | | | |
|---|---|---|---|
| 8,711,821 B2 | 4/2014 | Grandhi | |
| 8,995,257 B2 | 3/2015 | Chu et al. | |
| 9,215,747 B2 | 12/2015 | Lee et al. | |
| 9,392,524 B2 | 7/2016 | Grandhi | |
| 9,414,267 B2 | 8/2016 | Li et al. | |
| 9,516,647 B2 | 12/2016 | Seok | |
| 9,820,304 B2 | 11/2017 | Gong et al. | |
| 9,900,878 B2 | 2/2018 | Seok | |
| 9,913,296 B2 | 3/2018 | Seok | |
| 2011/0110349 A1 | 5/2011 | Grandhi | |
| 2011/0255620 A1 | 10/2011 | Jones, IV et al. | |
| 2015/0103722 A1 | 4/2015 | Seok | |
| 2015/0117436 A1 | 4/2015 | Jafarian | |
| 2015/0181560 A1 | 6/2015 | Jamadagni et al. | |
| 2015/0334751 A1* | 11/2015 | Alanen | H04W 48/16 370/329 |
| 2016/0105888 A1* | 4/2016 | Seok | H04W 72/0446 370/329 |
| 2016/0381704 A1* | 12/2016 | Chu | H04W 52/0216 370/329 |
| 2017/0237532 A1* | 8/2017 | Li | H04L 5/0007 370/338 |
| 2017/0295571 A1 | 10/2017 | Chu et al. | |
| 2017/0338935 A1* | 11/2017 | Ahn | H04W 72/0446 |
| 2019/0053155 A1* | 2/2019 | Kneckt | H04W 52/0216 |
| 2019/0158413 A1* | 5/2019 | Patil | H04W 88/06 |
| 2019/0174410 A1* | 6/2019 | Seok | H04W 72/0406 |
| 2019/0215884 A1* | 7/2019 | Patil | H04W 74/006 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Kwon et al., "SIG Field Design Principle for 11ax," Newracon, doc. IEEE 802.11-15/0344r2, Mar. 2015, 18 pages.

Nurchis et al., "Target Wake Time: Scheudled Access in IEEE 802.11ax WLANs," Cornell University document arXiv:1804.07717 <https://arxiv.org/abs/1804.07717>; pp. 1-13 (Apr. 20, 2018).

Seok et al., "HEW PPDU Format for Supporting MIMO-OFDMA," IEEE 802.11-14/1210r0, 16 pages, (Sep. 14, 2014).

Stacey, "Specification Framework for TGax," doc. IEEE 802.11-15/0132r12, vol. 802.11ax, No. 12, 38 pages (Dec. 1, 2015).

Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.

International Search Report and Written Opinion in International Patent Application No. PCT/US2019/015921, dated Apr. 18, 2019 (12 pages).

Seok et al. "Notification of Operating Mode Changes," Doc. No. IEEE 802.11-15/1034r0 (Sep. 13, 2015) 11 pages.

* cited by examiner

OPERATION WITH BANDWIDTH-LIMITED DEVICES IN A WIRELESS NETWORK

CROSS REFERENCES TO RELATED APPLICATIONS

This application claims the benefit of U.S. Provisional Patent App. No. 62/624,642, entitled "HE 20 MHZ ONLY DEVICES IN 5 GHZ BAND," filed on Jan. 31, 2018, the disclosure of which is hereby expressly incorporated herein by reference in its entirety.

FIELD OF TECHNOLOGY

The present disclosure relates generally to wireless communication systems, and more particularly wireless communication devices reporting bandwidth capabilities to other communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes allocating, at a first communication device to a plurality of second communication devices, respective portions of a communication channel that includes a plurality of component channels including i) at least one primary component channel and ii) one or more non-primary component channels, wherein the plurality of second communication devices includes a bandwidth-limited second communication device configured to operate with a maximum bandwidth that is less than a full bandwidth of the communication channel, wherein the bandwidth-limited second communication device is operating in a particular component channel of the plurality of component channels, and allocating the respective frequency portions includes allocating a frequency portion to the bandwidth-limited second communication device, wherein allocation of the frequency portion to the bandwidth-limited second communication device is restricted to the particular component channel in which the second bandwidth-limited communication device is operating. The method also includes transmitting, with the first communication device, a first data unit to the plurality of second communication devices, the first data unit including one or both of i) respective data for ones of the plurality of second communication devices in the respective frequency portions allocated to the respective ones of the plurality of second communication devices and ii) one or more trigger frames to prompt transmission of respective data by ones of the plurality of second communication devices in the respective frequency portions allocated to the respective ones of the plurality of second communication devices.

In another embodiment, an apparatus comprises a first network interface device associated with a first communication device, wherein the first network interface device comprises one or more integrated circuit (IC) devices configured to allocate, to a plurality of second communication devices, respective portions of a communication channel that includes a plurality of component channels including i) at least one primary component channel and ii) one or more non-primary component channels, wherein the plurality of second communication devices includes a bandwidth-limited second communication device configured to operate with a maximum bandwidth that is less than a full bandwidth of the communication channel, wherein the bandwidth-limited second communication device is operating in a particular component channel of the plurality of component channels, and allocating the respective frequency portions includes allocating a frequency portion to the bandwidth-limited second communication device, wherein allocation of the frequency portion to the bandwidth-limited second communication device is restricted to the particular component channel in which the bandwidth-limited second communication device is operating. The one or more IC devices are also configured to transmit a first data unit to the plurality of second communication devices, the first data unit including one or both of i) respective data for ones of the plurality of second communication devices in the respective frequency portions allocated to the respective ones of the plurality of second communication devices and ii) one or more trigger frames to prompt transmission of respective data by ones of the plurality of second communication devices in the respective frequency portions allocated to the respective ones of the plurality of second communication devices.

DETAILED DESCRIPTION

Figure 1:
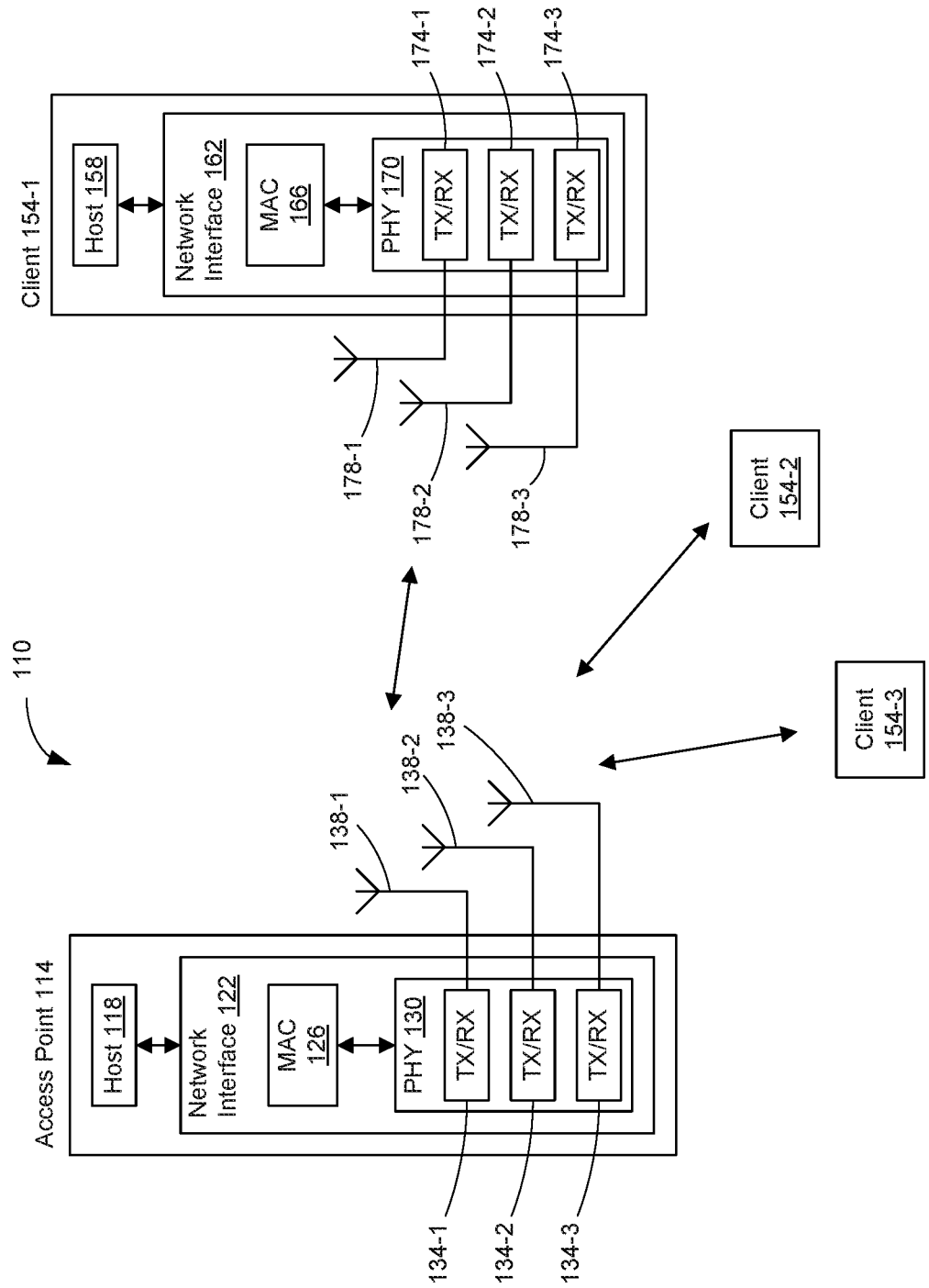
FIG. 1 is a block diagram of an example wireless local area network (WLAN), according to an embodiment.

In embodiments described below, a first communication device (e.g., an AP) and one or more second communication devices (e.g., client stations) operate using a communication channel that includes a plurality of component channels, including a primary component channel and one or more non-primary component channels. The one or more second communication devices include a bandwidth-limited second communication device that is capable of operating with at most a maximum bandwidth that is less than a full bandwidth of the communication channel. For example, in an embodiment, the bandwidth-limited second communication device is capable of operating with a maximum bandwidth that corresponds to a bandwidth of only a single component channel of the communication channel. In an embodiment, the bandwidth-limited second communication device is required to operate in a primary component channel of the communication channel. In another embodiment, the bandwidth-limited second communication device is permitted to operate in any component channel of the communication channel, including a non-primary component channel. For example, the bandwidth-limited second communication device may operate in a particular non-primary component channel that may be negotiated between the first communication device and the bandwidth-limited second communication device, in an embodiment.

In an embodiment, when the bandwidth-limited second communication device is operating in a non-primary component channel of the communication channel, communications between the first communication device and the bandwidth-limited second communication device are restricted to communications included in multi-user transmissions (e.g., orthogonal frequency division multiple access (OFDMA) transmissions) in which respective frequency portions of the communication channel are used for simultaneous transmissions to or by a group of second communication devices. For multi-user transmissions, in an embodiment, the first communication device allocates respective frequency portions of the communication channel to respective second communication devices in the group of second communication devices, and simultaneously transmits respective data to the second communication devices in the respective frequency portions allocated to the second communication devices and/or prompts transmission of respective data by the second communication devices in the respective frequency portions allocated to the second communication devices. Generally, the first communication device may allocate any frequency portion of the communication channel to any second communication device in the group of second communication devices, in an embodiment. However, when the group of second communication device includes a bandwidth-limited second communication device, the first communication device restricts allocation of a frequency portion to the bandwidth-limited second communication device to the particular component channel in which the bandwidth-limited second communication device is operating, in an embodiment.

In at least some embodiments, restricting communication between the first communication device and the bandwidth-limited second communication device to multi-user transmissions and also restricting allocation of a frequency portion to the bandwidth-limited second communication device to the particular component channel in which the second communication device is operating ensures that i) data of the bandwidth-limited second communication device is included in a frequency portion in the particular component channel in which the bandwidth-limited second communication device is operating and ii) transmissions between the first communication device and the bandwidth-limited second communication device are included in transmissions that include the primary component channel, even if the bandwidth-limited second communication device is operating in a non-primary component channel. Because transmissions between the first communication device and the bandwidth-limited second communication device are included in transmissions that include the primary component channel even if the bandwidth-limited second communication device is operating in a non-primary component channel, other communication devices that are monitoring the primary component channel are able to determine that the communication channel is occupied based on detecting the transmissions in the primary component channel and to refrain from attempting to transmit in the communication channel, in an embodiment.

In some embodiments, a communication device (e.g., an AP or a client station) operating using a communication channel that includes a plurality of component channels is configured to perform channel access procedures, such as carrier sense and backoff procedures, in multiple ones of the component channels. Performing channel access procedures in multiple one of the component channels allows the communication device to transmit in one or more non-primary component channels that are determined to be idle even if a primary component channel is determined to be busy, in an embodiment. Thus, for example, transmissions to or by a bandwidth-limited communication device that is operating in a non-primary component channel of the communication channel can occur in the non-primary component channel even when the primary component channel of the communication channel is busy, in an embodiment.

Embodiments of methods and apparatus are described below in the context of wireless local area networks (WLANs) that utilize protocols related to protocols defined by the 802.11 Standard from the Institute of Electrical and Electronics Engineers (IEEE) merely for explanatory purposes. In other embodiments, however, techniques for operation in with bandwidth-limited communication devices are utilized in other types of communication systems such as non-IEEE 802.11 WLANs, personal area networks (PANs), mobile communication networks such as cellular networks, metropolitan area networks (MANs), satellite communication networks, etc.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets," and MAC layer data units are sometimes referred to herein as "frames."

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

In an embodiment, the MAC processor 126 and the PHY processor 130 are configured to operate according to a first WLAN communication protocol, and also according to one or more second WLAN communication protocols (e.g., as defined by one or more of the IEEE 802.11n Standard, IEEE 802.11ac Standard, the IEEE 802.11ax Standard and/or other suitable WLAN communication protocols) that are legacy protocols with respect to the first WLAN communication protocol. The one or more second WLAN communication protocols are sometimes collectively referred to herein as a "legacy WLAN communication protocol" or simply "legacy protocol."

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, the MAC processor 166 and the PHY processor 170 are configured to operate according to the first WLAN communication protocol, and also according to the legacy WLAN communication protocol.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, at least one client station 154 (e.g., the client station 154-3) is a bandwidth-limited client station that is configured to operate with at most a maximum bandwidth that is less than a full bandwidth of a communication channel used in the WLAN 110 for communication between the AP 114 and the client stations 154 (sometime referred to herein as "a basic service set (BSS) operating channel" or simply "communication channel"). For example, in an embodiment, the communication channel comprises a plurality of non-overlapping component channels, and a bandwidth-limited client station 154 is configured to operate with a maximum bandwidth corresponding to a bandwidth of a single component channel. According to one illustrative embodiment, the communication channel comprises multiple non-overlapping 20 MHz component channels and has an overall bandwidth of 40 MHz, 80 MHz, 160 MHz, etc., whereas the bandwidth-limited client station 154 is configured to operate with a maximum bandwidth of 20 MHz corresponding to a single 20 MHz component channel. For ease of explanation, a bandwidth-limited client station is sometimes referred to herein as a "20 MHz-only" client station. In other embodiments, however, a bandwidth-limited client station is configured to operate with a suitable maximum bandwidth other than 20 MHz (e.g., 1 MHz, 2 MHz, etc.). Similarly, a communication channel of the BSS supported by the AP 114 has a suitable maximum bandwidth other than 40 MHz, 80 MHz, 160 MHz, etc. (e.g., 4 MHz, 8 MHz, 16 MHz, etc.), in some embodiments.

In an embodiment, the AP 114 and the client stations 154 are configured for multi-user (MU) communications that involve simultaneous transmissions to or by multiple communication devices. For example, the AP 114 and the client stations 154 are configured for communications using MU multiple input multiple output (MIMO) techniques in which different data streams are simultaneously transmitted to or by different client stations 154 via different spatial streams, according to some embodiments. As another example, the AP 114 and the client stations 154 are configured for communications using OFDMA techniques in which different data streams are simultaneously transmitted to or by different client stations 154 in different frequency portions of a communication channel, according to some embodiments. In some embodiments, MU MIMO techniques and OFDMA techniques are used during the same MU transmission, e.g., to transmit some data streams via different frequency portions and to transmit some data streams via different spatial streams within a same frequency portion. A downlink (DL) MU transmission refers to an MU transmission from the AP 114 to multiple client stations 154. An uplink (UL) MU transmission refers to an MU transmission from multiple client stations 154 to the AP 114. In an embodiment, the AP 114 and the client stations 154 are additionally configured for single user (SU) communications that involve transmission to or by a single client station 154. A DL SU transmission refers to an SU transmission from the AP 114 to a single client station 154. A UL SU transmission refers to an SU transmission from a single client station 154 to the AP 114.

Figures 2A, 2B:
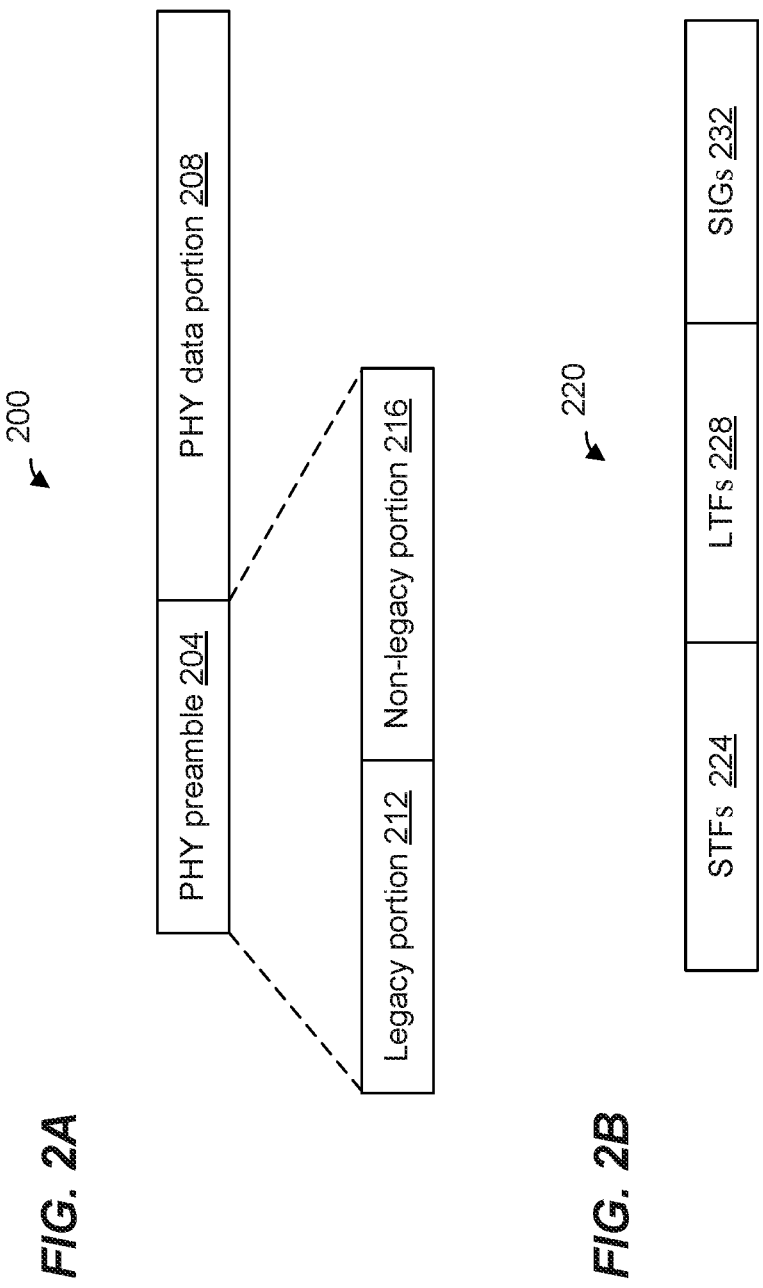
FIG. 2A is a block diagram of an example physical layer (PHY) data unit, according to an embodiment.
FIG. 2B is a block diagram of an example preamble of a PHY data unit, according to an embodiment.

FIG. 2A is a diagram of an example PPDU 200 that the network interface device 122 (FIG. 1) is configured to generate and transmit to one or more client stations 154 (e.g., the client station 154-1 or a group of client stations that includes the client stations 154-1, 154-2 and 154-3), according to an embodiment. The network interface device 162 (FIG. 1) may also be configured to transmit data units the same as or similar to the PPDU 200 to the AP 114.

The PPDU 200 includes a PHY preamble 204 and a PHY data portion 208. The PHY preamble 204 may include at least one of a legacy portion 212 and a non-legacy portion 216, in at least some embodiments. In an embodiment, the legacy portion 212 is configured to be processed by legacy communication devices in the WLAN 110 (i.e., communication devices that operate according to a legacy communication protocol), enabling the legacy communication devices to detect the PPDU 200 and to obtain PHY information corresponding to the PPDU 200, such as a duration of the PPDU 200.

FIG. 2B is a diagram of an example PHY preamble 220. In an embodiment, the PHY preamble 220 corresponds to the PHY preamble 204. In an embodiment, the PHY preamble 220 is included in the legacy portion 212. In another embodiment, the PHY preamble 220 is included in the non-legacy portion 216. The PHY preamble 220 includes one or more short training fields (STFs) 224, one or more long training field (LTFs) 228, and one or more signal fields (SIGs) 232. In an embodiment, the STFs 224 and the LTFs 228 are used for packet detection, automatic gain control (AGC), frequency offset estimation, channel estimation, etc. In an embodiment, the number of LTFs in the LTFs 228 correspond to a number of spatial/space-time streams used for transmission of the PPDU 200. In an embodiment, the SIGs 232 are used to signal PHY communication parameters (e.g., a modulation and coding scheme (MCS), a number of spatial streams, a frequency bandwidth, etc.) corresponding to the PPDU 200.

In some embodiments, the PHY preamble 220 omits one or more of the fields 224-232. In some embodiments, the PHY preamble 220 includes one or more additional fields not illustrated in FIG. 2B. In some embodiments, the order of the fields 224-232 is different than illustrated in FIG. 2B. In an embodiment, the PPDU 200 is generated and transmitted as a sequence of orthogonal frequency division multiplexing (OFDM) symbols. In an embodiment, each of the STF 224, the LTF 228, the SIG 232, and the data portion 208 comprises one or more OFDM symbols.

In an embodiment, the PPDU 200 has a 20 MHz bandwidth and is transmitted in a 20 MHz communication channel. In other embodiments, the PPDU 200 has a suitable bandwidth different from 20 MHz and is transmitted in a communication channel having a corresponding other suitable bandwidth. For example, in some embodiments, the PPDU 200 has a bandwidth of 40 MHz, 80 MHz, 160 MHz, etc., and is correspondingly transmitted in a 40 MHz, 80 MHz, 160 MHz, etc., communication channel, respectively. In some such embodiments, at least a portion of the PPDU 200 (e.g., at least a legacy portion of the PHY preamble 204, or the entirety of the PHY preamble 204) is generated by generating a field corresponding to a 20 MHz component channel of the communication channel and duplicating the field over a number of 20 MHz channels corresponding all component channels of the communication channel. For example, in an embodiment in which the PPDU 200 occupies an 80 MHz communication channel, at least the legacy portion 212 corresponding to the 20 MHz component channel bandwidth is duplicated in each of four 20 MHz component channels that comprise the 80 MHz communication channel. In an embodiment, duplication of at least a portion of the PPDU 200 duplicating the field over a number of 20 MHz channels corresponding all component channels of the communication channel allows communication devices that are operating in only a portion of the communication channel to obtain pertinent information, such as data unit duration information included in the duplicated portion of the PPDU 200, in any of the component channels of the communication channel. The communication device may utilize the obtained information to, for example, determine a length of time for which the communication channel is expected to be occupied in connection with transmission of the PPDU 200 and to refrain from attempting to transmit in the communication channel for the determined length of time, in an embodiment.

In an embodiment, the PPDU 200 is an MU OFDMA data unit in which different data streams are transmitted to or by multiple client stations 154 using respective sets of OFDM tones allocated to the client stations 154. For example, in an embodiment, available OFDM tones (e.g., OFDM tones that are not used as DC tone and/or guard tones) are segmented into multiple resource units (RUs), and each of the multiple RUs is allocated to one or more client stations 154. In an embodiment, the PPDU 200 is an MU-MIMO PHY data unit in which different data streams are transmitted to or by multiple client stations 154 using respective spatial streams allocated to the client stations 154.

In an embodiment, the communication channel utilized for communications between the AP 114 and the client stations 154 includes a plurality of component channels including a primary component channel and one or more non-primary component channels. A primary component channel is sometimes referred to herein as simply "primary channel", and a non-primary component channel is sometimes referred to herein as simply "non-primary channel" or "secondary channel." The primary channel is utilized by communication devices (e.g., the AP 114 and client stations 154) operating for various operations. For example, the primary channel is utilized for various management transmissions (e.g., transmissions associated with association of a client station 154 with the AP 114, beacon transmissions by the AP 114, operating channel bandwidths switch announcement transmissions, etc.), in an embodiment. As another example, the primary channel is utilized by the communication devices for channel access procedures, such as back-off procedures, clear channel assessment (CCA) procedures, carrier sensing procedures, etc., in an embodiment.

In an embodiment, a bandwidth-limited client station 154 is permitted to operate only in a primary channel of the communication channel. As an example, a 20 MHz-only client station 154 is permitted to operate only in a 20 MHz primary channel of the communication channel, in an embodiment. In another embodiment, a bandwidth-limited client station 154 is permitted to operate in any component channel, including a non-primary component channel, of the communication channel. In an embodiment, the AP 114 and the bandwidth-limited client station 154 are configured to negotiate in which particular component channel of the communication channel the bandwidth-limited client station 154 will be operating. For example, in an embodiment, after association of the bandwidth-limited client station 154 with the AP 114, which may occur in the primary channel, a negotiation procedure is performed between the bandwidth-limited client station 154 and the AP 114 to negotiate in which component channel of the communication channel the bandwidth-limited client station 154 will be operating. After negotiation, the bandwidth-limited client station 154 switches from the primary component channel to the negotiated non-primary component channel, in an embodiment.

In an embodiment, to allow client stations that are operating in non-primary component channels of the communication channel to receive management frames in the non-primary channel, the AP 114 is configured to transmit management frames, such as beacon frames, duplicated in each component channel of the communication channel. For example, in an embodiment, the AP 114 is configured to transmit management frames, such as beacon frames, using duplicate legacy (e.g., non-HT) PPDU format. In an embodiment, duplicate management frames are transmitted in each component channel of the communication channel, allowing communication devices, such as bandwidth-limited client stations 154, operating in non-primary component channels to receive the management frames in the non-primary component channels. In some embodiments, transmission of duplicate management frames is used for suitable purposes other than for operation with bandwidth-limited client stations.

In an embodiment, SU transmissions and/or MU transmissions in the communication channel must include the primary channel of the communication channel. Thus, for example, SU transmissions to or by a bandwidth-limited client station 154 that is operating in a non-primary channel are not permitted, in an embodiment. That is, communications between the AP 114 and a bandwidth-limited client station 154 that is operating in a non-primary channel are limited to MU communications, in an embodiment. Transmissions that include the primary channel allow communication devices that are not intended recipients of the transmission to accurately set channel access parameters, such as network allocation vectors (NAVs), based on detecting the transmission in the primary channel and to refrain from attempting to transmit in the communication medium for the duration indicated in the transmission, in an embodiment. In other embodiments, however, SU transmissions and/or MU transmissions that do not include the primary channel are permitted. For example, SU transmissions to or by a bandwidth-limited client station 154 that is operating in a non-primary channel are permitted, in an embodiment.

In an embodiment, allocation of a frequency portion to a bandwidth-limited client station 154 for MU communications, that include transmissions to or by the bandwidth-limited client station 154, is restricted to the particular component channel in which the bandwidth-limited client station 154 is operating. For example, if a bandwidth-limited client station 154 is operating in the primary component channel, such as in an embodiment in which bandwidth-limited devices are not permitted to operate in non-primary component channels, allocation of a frequency portion to the bandwidth-limited client station 154 is restricted to the primary component channel. On the other hand, if a bandwidth-limited client station 154 is operating in a particular non-primary component channel, such as a negotiated non-primary component channel, allocation of a frequency portion to the bandwidth-limited client station 154 is restricted to the particular non-primary component channel, in an embodiment.

Figure 3:
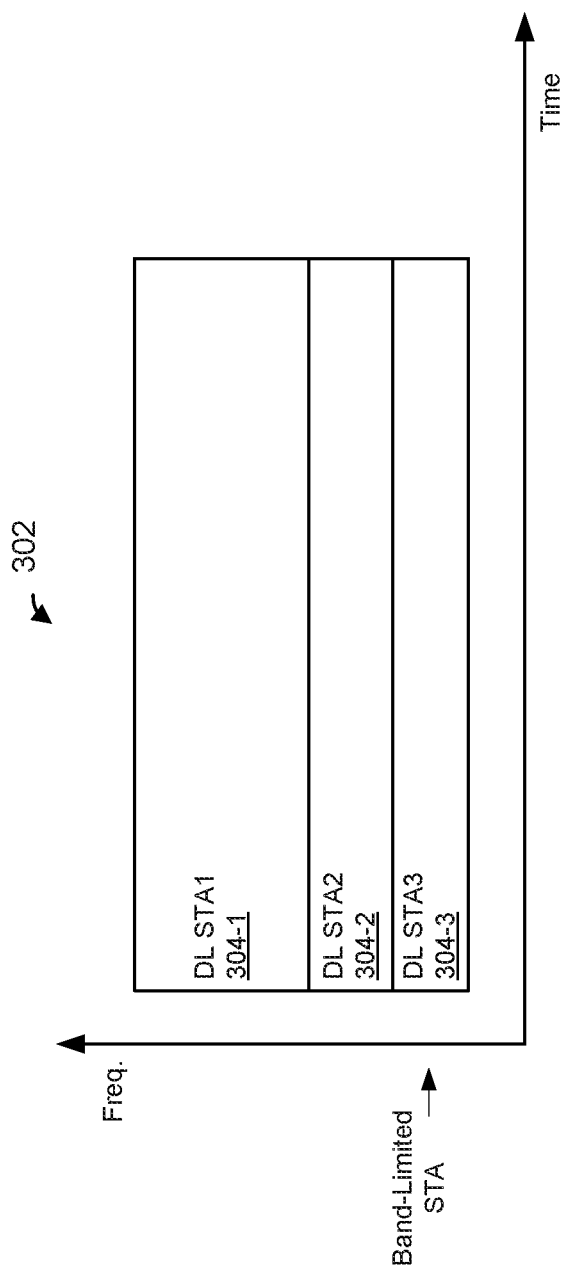
FIG. 3 is a block diagram of an example data unit transmitted from an access point (AP) to a group of client stations that includes at least one bandwidth-limited client station, according to an embodiment.

FIG. 3 is a block diagram of an example DL OFDMA data unit 302 transmitted from the AP 114 to a group of client stations 154 that includes at least one bandwidth-limited client station 154 (e.g., STA3), according to an embodiment. The DL OFDMA data unit 302 corresponds to the data unit 200 of FIG. 2, in an embodiment. The DL OFDMA data unit 302 is a data unit different from the data unit 200 of FIG. 2, in another embodiment. The DL OFDMA data unit 302 includes respective data units 304 transmitted to respective client stations 154 in respective frequency portions (e.g., RUs) allocated to the client stations 154. In an embodiment, allocation of a frequency portion to the bandwidth-limited client station 154 is restricted to a particular component channel in which the bandwidth-limited client station 154 is operating. The particular component channel in which the bandwidth-limited client station 154 may be a primary channel or may be a non-primary channel, in various embodiments. For example, in an embodiment in which bandwidth-limited client stations are required to operate in the primary channel, allocation of a frequency portion to the bandwidth-limited client station 154 is restricted to the primary channel. On the other hand, in an embodiment in which bandwidth-limited client stations are permitted to operate in non-primary channels and in which the bandwidth-limited client station 154 is operating in a non-primary channel (e.g., a previously negotiated non-primary channel), allocation of a frequency portion to the bandwidth-limited client station 154 is restricted to the non-primary channel in which the in which the bandwidth-limited client station 154 is operating, in an embodiment. Thus, for example, in an embodiment in which the bandwidth-limited client station 154 is operating in a non-primary component channel, the AP 114 allocates to the bandwidth-limited client station 154 one or more RUs in the non-primary component channel. The AP 114 also allocates any of the remaining available RUs to any of the other client stations 154 in the group. The AP 114 then generates the DL OFDMA data unit 302 such that data for respective client stations 154 is included in the RUs allocated to the respective client stations 154, in an embodiment. Thus, data for the bandwidth-limited client station 154 is included in the DL OFDMA data unit 302 in the particular component channel in which the bandwidth-limited client station 154 is operating, allowing the bandwidth-limited client station 154 to receive its data in the particular component channel in which the bandwidth-limited client station 154 is operating, in an embodiment.

Figure 4:
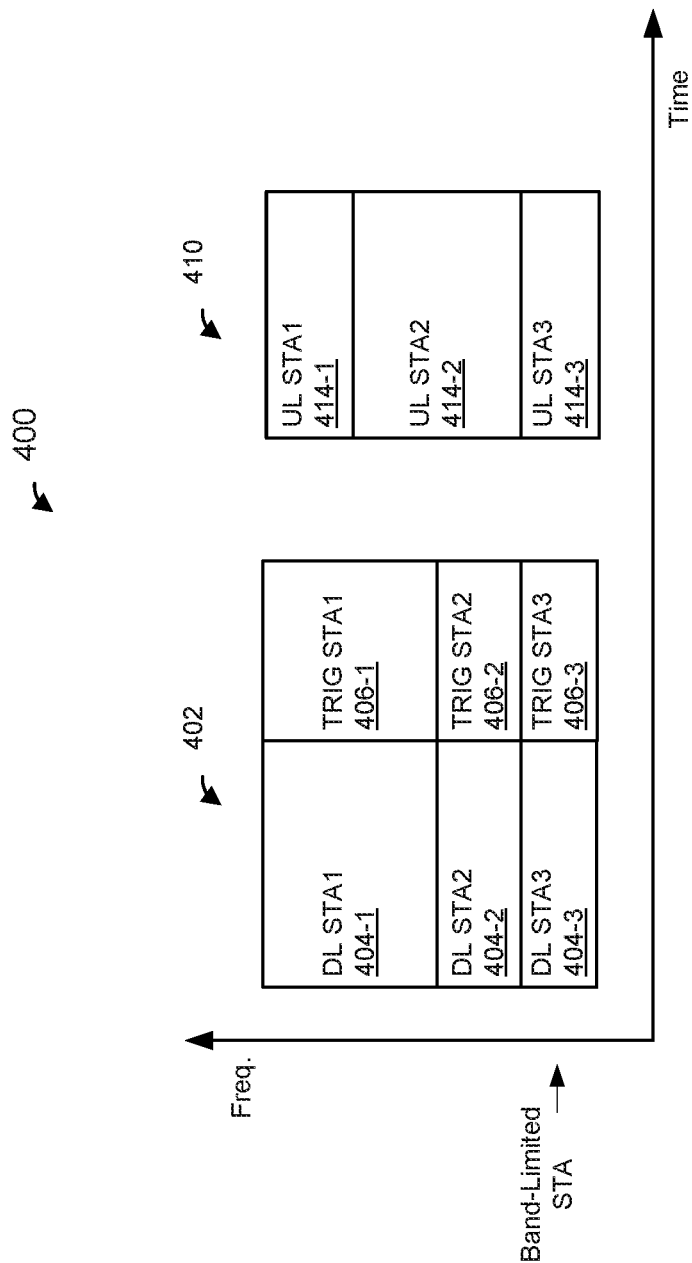
FIG. 4 is a block diagram of a communication exchange between an AP and a group of client stations that includes at least one bandwidth-limited client station, according to an embodiment.

FIG. 4 is a block diagram of a communication exchange 400 between the AP 114 and a group of client stations 154 that includes at least one bandwidth-limited client station 154 (e.g., STA3), according to an embodiment. The communication exchange 400 includes a DL OFDMA data unit 402 (e.g., DL PPDU). The DL OFDMA data unit 402 corresponds to the data unit 200 of FIG. 2, in an embodiment. The DL OFDMA data unit 402 is a data unit different from the data unit 200 of FIG. 2, in another embodiment. Similar to the DL data unit 302 of FIG. 3, the DL data unit 402 includes respective DL data units 404 transmitted to respective client stations 154 in respective frequency portions (e.g., RUs) allocated to the client stations 154. Additionally, the DL OFDMA data unit 402 includes trigger frames 406 that include UL scheduling information to prompt the group of client stations 154 to transmit an UL OFDMA PHY data unit 410 (e.g., an UL OFDMA PPDU) a suitable time period after an end of the DL OFDMA data unit 402, in an embodiment. In another embodiment, the DL OFDMA data unit 402 includes UL scheduling information in formats other than a trigger frame format, such as, for example, uplink response scheduling information, triggered response scheduling information, etc. In response to receiving the trigger frames 406 or UL scheduling information in another format, the client stations 154 transmit respective UL data units 414 as parts of the UL OFDMA PHY data unit 410 the suitable time period after the end of the DL OFDMA data unit 402, in an embodiment.

In an embodiment, allocation of a frequency portion for transmission of the DL data unit 404 (e.g., the DL data unit 404-3) to the bandwidth-limited client station 154 is restricted to a particular component channel in which the bandwidth-limited client station 154 is operating. Similarly, allocation of a frequency portion for transmission of the UL data unit 414 (e.g., the DL data unit 414-3) by the bandwidth-limited client station 154 is restricted to the particular component channel in which the bandwidth-limited client station 154 is operating, in an embodiment. In an embodiment, the AP 114 allocates to the bandwidth-limited client station 154 a same frequency portion, in the particular component channel in which the bandwidth-limited client station 154 is operating, for transmission of the DL data unit 404 to the bandwidth-limited client station 154 and for transmission of the UL data unit 414 by the bandwidth-limited client station 154. In another embodiment, the AP 114 allocates to the bandwidth-limited client station 154 a same frequency portion, in the particular component channel in which the bandwidth-limited client station 154 is operating, a first frequency portion for transmission of the DL data unit 404 to the bandwidth-limited client station 154 and a second frequency for transmission of the UL data unit 414 by the bandwidth-limited client station 154, where the second frequency portion is different (e.g., includes one or more different RUs) than the first frequency portion.

The trigger frames 406 include user-specific allocation information to indicate to the respective client stations in the group of client stations 154 particular frequency portions (e.g., RUs) that are allocated to the client stations 154 for transmission of the UL OFDMA PHY data unit 410, in an embodiment. The trigger frames 406 additionally include other information, such as length or duration of the UL OFDMA PHY data unit 410, power level at which the UL OFDMA PHY data unit 410 is to be transmitted, etc., in some embodiments. In an embodiment, different trigger frames 406 include different user-specific allocation information corresponding to different ones of the client stations 154. In an embodiment, user-specific allocation information corresponding to the bandwidth-limited client station 154, and other parameters pertinent to transmission of the UL data unit 414 by the bandwidth-limited client station 154, are included in a trigger frame 406 (e.g., the trigger frame 406-3) that is transmitted in the particular component channel in which the bandwidth-limited client station 154 is operating. For example, in an embodiment, user-specific allocation information corresponding to the bandwidth-limited client station 154, and other parameters pertinent to transmission of the UL data unit 414 by the bandwidth-limited client station 154, are included in a trigger frame 406 (e.g., the trigger frame 406-3) that is included in the DL data unit 404 that is transmitted to the bandwidth-limited client station 154 in the particular component channel in which the bandwidth-limited client station 154 is operating. Including user-specific allocation information corresponding to the bandwidth-limited client station 154, and other parameters pertinent to transmission of the UL data unit 414 by the bandwidth-limited client station 154, in a trigger frame that is transmitted in the particular component channel in which the bandwidth-limited client station 154 is operating ensures that the bandwidth-limited client station 154 will be able to receive and decode the user-specific allocation information and the other parameters without receiving and decoding other frequency portions of the DL OFDMA data unit 402, in an embodiment.

Respective client stations in the group of client stations 154 determine based on information in the trigger frames 406 respective frequency portions allocated to the client station 154 for uplink transmission to the AP 114 and other parameters for the transmission uplink transmission to the AP 114. The client stations 154 transmit, in the respective frequency portions allocated to the client stations 154, respective UL data units 414 as parts of the UL OFDMA PHY data unit 410, in an embodiment.

Figure 5:
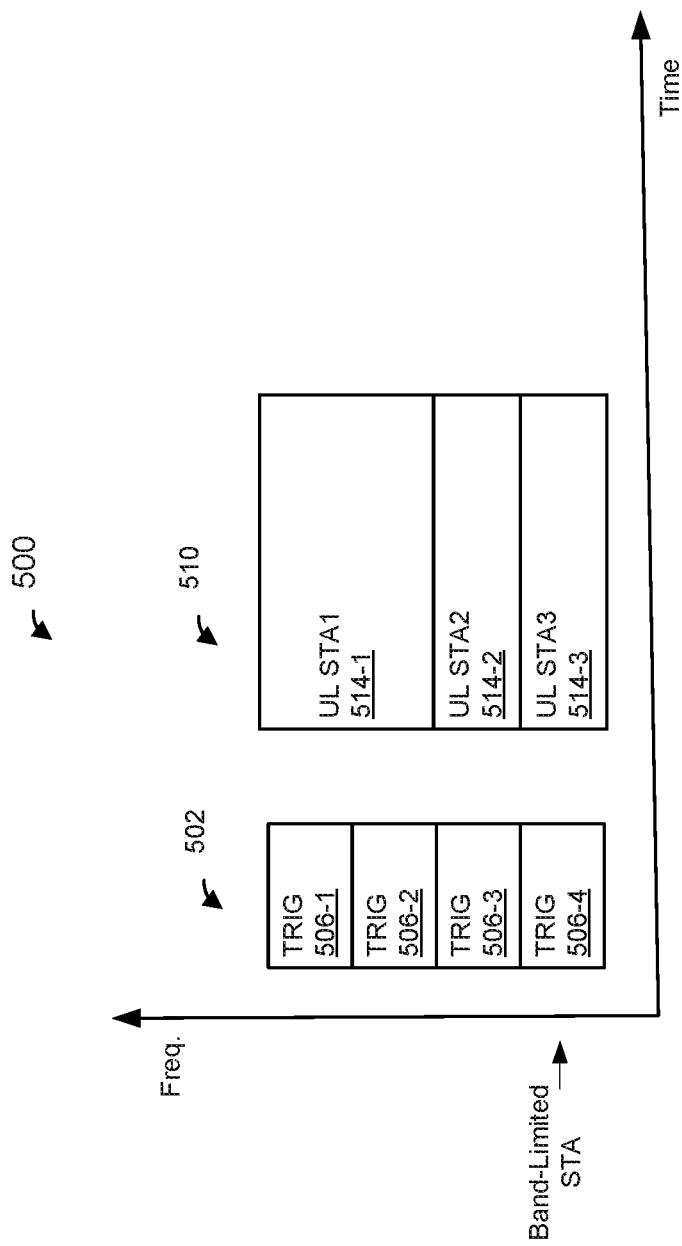
FIG. 5 is a block diagram of another communication exchange between an AP and a group of client stations that includes at least one bandwidth-limited client station, according to another embodiment.

FIG. 5 is a block diagram of a communication exchange 500 between the AP 114 and a group of client stations 154 that includes at least one bandwidth-limited client station 154 (e.g. STA3), according to another embodiment. The communication exchange 500 includes a DL data unit 502 (e.g., DL PPDU). The DL data unit 502 corresponds to the data unit 200 of FIG. 2, in an embodiment. The DL data unit 502 is a data unit different from the data unit 200 of FIG. 2, in another embodiment. The DL data unit 502 includes trigger frames 506 to prompt the group of client stations 154 to transmit an UL OFDMA PHY data unit 510 (e.g., an UL OFDMA PPDU) a suitable time period after an end of the DL data unit 502. Trigger frames 506 include user-specific allocation information to indicate to the respective client stations in the group of client stations 154 particular frequency portions (e.g., RUs) that are allocated to the client stations 154 for transmission of the UL OFDMA PHY data unit 510, in an embodiment. The trigger frames 506 additionally include other information, such as length or duration of the UL OFDMA PHY data unit 410, power level at which the UL OFDMA PHY data unit 510 is to be transmitted, etc., in some embodiments.

In an embodiment, to allow the bandwidth-limited client station 154 to receive and decode allocation information corresponding to the bandwidth-limited client station 154 in the particular component channel in which the bandwidth-limited client station 154 is operating, each trigger frame 506 includes allocation information for each of the client stations 154 in the group. For example, in an embodiment, a duplicate mode (e.g., non-HT duplicate mode defined by the IEEE 802.11 communication protocol) is used to transmit the DL data unit 502, where a trigger frame is generated to include allocation information for each of the client stations 154, and the trigger frame is duplicated for transmission in each component channel, in an embodiment. In an embodiment, the bandwidth-limited client station 154 receives the trigger frame 506 transmitted in the component channel in which the bandwidth-limited client station 154 is operating. Thus, for example, a bandwidth-limited client station 154 that is operating in a non-primary component channel receives the trigger frame 506 transmitted in the corresponding non-primary component channel and, based on the trigger frame 506 received in the non-primary component channel, the bandwidth-limited client station 154 determines its allocation information and other parameters pertinent to transmission of its UL data unit 514 as a part of the UL OFDMA data unit 510, in an embodiment.

In some embodiments, a bandwidth-limited client station 154 operates in a mixed mode in which the bandwidth-limited client station 154 switches between operating in a non-primary component channel during some times and operating in a primary component channel during other times. For example, in an embodiment, a non-primary component channel is negotiated between a bandwidth-limited client station 154 and the AP 114 for use during only some time scheduled periods, such as target wake time (TWT) scheduled periods (SP), and the bandwidth-limited client station 154 switches to the non-primary component channel for operation during the scheduled time periods to a primary component channel for operation outside of the scheduled time periods.

Figure 6:
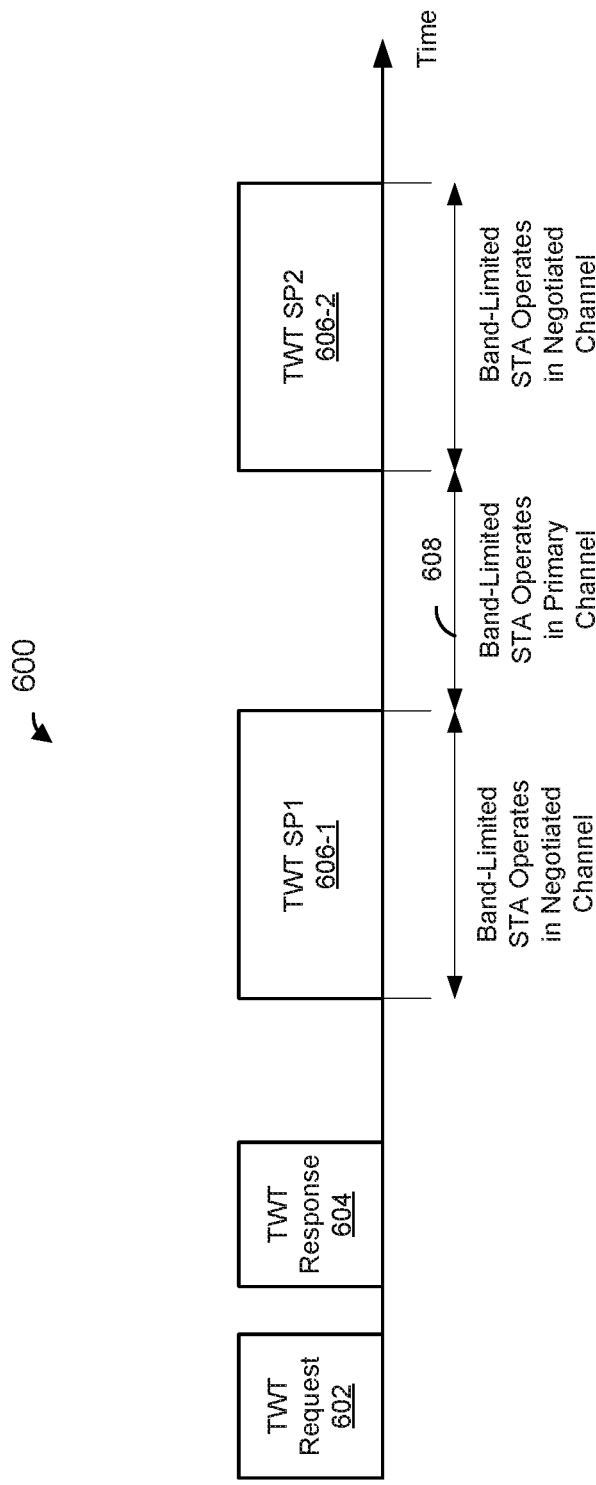
FIG. 6 is a block diagram of a scheduled communication session, according to an embodiment.

FIG. 6 is a diagram of a scheduled transmissions session 600 between the AP 114 and one or more client stations 154 including a bandwidth-limited client station 154, according to an embodiment. In an embodiment, the scheduled transmissions session 600 corresponds to a target wake time (TWT) session, and the scheduled transmissions session 600 is described herein in the context of a TWT session and is sometimes referred to herein as a "TWT session" 600. In other embodiments, however, the scheduled transmissions session 600 is a suitable scheduled session different from a TWT session. In an embodiment, the bandwidth-limited client station 154 transmits a TWT request data unit (e.g., MAC data unit or frame) 602 to the AP 114. In response to receiving the TWT request data unit 600, the AP 114 transmits a TWT response data unit 604 to the bandwidth-limited client station 154. The TWT request data unit 602 and the TWT response data unit 604 are transmitted in the primary channel of the communication channel, in an embodiment. The TWT request data unit 602 and the TWT response data unit 604 include respective information elements (e.g., TWT elements) to negotiate/indicate parameters of the TWT session 600, in an embodiment. The parameters negotiated/indicated by the TWT request data unit 602 and the TWT response data unit 604 include i) a start time of a first TWT scheduled period (SP) 606-1 and ii) a TWT interval that defines times at which subsequent one or more TWT SP, such as a second TWT SP 606-2, during the TWT session 600 will occur, in an embodiment. The parameters negotiated/indicated by the TWT request data unit 602 and the TWT response data unit 604 additionally include a particular component channel in which the bandwidth-limited client station 154 will be operating during the one or more TWT SPs, in an embodiment.

In an embodiment, for operation during the TWT SPs 606, the client station switches to the particular component channel negotiated with the AP 114. Accordingly, during the TWT SPs 606, the AP 114 transmits data units to and/or receives data units from the bandwidth-limited client station 154 in the particular negotiated component channel, in an embodiment. For example, for MU communication with a group of client stations 154 that includes the bandwidth-limited client station 154, the AP 114 restricts allocation of frequency portion(s) for transmission to or by the bandwidth-limited client station 154 to the particular negotiated component channel. On the other hand, for operation during the time period(s) 608 of the TWT session 600, the bandwidth-limited client station 154 switches to the primary channel of the communication channel. Thus, in the time period(s) 608, transmissions to or by the bandwidth-limited client station 154, if any, occurs in the primary channel, in an embodiment.

In an embodiment, the AP 114 and the client stations 154 contend for a communication medium using CCA mechanisms, such as carrier sense multiple access with collision avoidance (CSMA/CA) mechanism or another suitable channel assessment mechanism. In an embodiment, the AP 114 and the client stations 154 maintain respective network allocation vectors (NAVs) that include timers for tracking when another communication device has seized control or "ownership" of a wireless communication medium. For example, when a communication device (e.g., the AP 114 or a client station 154) receives a transmitted PHY data unit (e.g., the PHY data unit 200 of FIG. 2 or another suitable PHY data unit) that conforms to a particular communication protocol (e.g., the IEEE 802.11 Standard, a future version of the IEEE 802.11 Standard, or another suitable communication protocol), the communication device examines duration information included in a header or a preamble of the PHY data unit, where the duration information indicates a length of time that another communication device has taken ownership of a communication medium. The communication device then uses the duration information in the PHY data unit to set a NAV timer, and the NAV timer begins to decrement. When a value of the NAV timer is non-zero, this indicates that another communication device owns the communication medium and that the communication device therefore should generally refrain from transmitting. On the other hand, when the value of the NAV timer reaches zero, this indicates that the communication medium is not currently owned by another communication device.

In an embodiment, when the NAV is zero, the communication device implements a physical carrier sensing and energy detection procedure in which the communication device senses an energy level of the medium for a predetermined length of time, such as a length of time corresponding to a distributed coordination function (DCF) interframe space (DIFS) time period or another suitable time period, in an embodiment. If detected energy in the medium during the predetermined length of time remains below a threshold, then the communication device invokes a backoff procedure in which the communication device continues to detect energy level of the medium, to determine whether medium is busy or idle, for an additional deferral time period. In an embodiment, the backoff procedure includes randomly or pseudorandomly choosing an initial value for the backoff timer when the current value of the backoff timer is zero. In an embodiment, the communication device chooses the initial value for the backoff timer from a range of initial values [0, CW], where CW is a contention window parameter, where the initial value and CW are in units of slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of CWmax. The parameters CWmin and CWmax are also in units of slots.

In an embodiment, while the communication device determines that the medium is idle, the communication device decrements the backoff timer. When the communication device determines that the communication medium is busy, the communication device pauses the backoff timer and does not resume decrementing the backoff timer until the communication medium is subsequently determined to be idle. In an embodiment, setting the backoff timer to an initial value chosen randomly or pseudo-randomly (e.g., as described above) ensures that backoff timers of different communication devices in the network tend to reach zero at different times. In an embodiment, when the backoff timer reaches zero, the communication device determines that the communication device is free to transmit.

Any suitable threshold energy level may be utilized. The threshold energy level for determining whether the medium is idle or busy may be different depending on the bandwidth of the channel being used by the communication device and/or on whether the energy corresponds to a transmission that conforms to a wireless communication protocol, according to some embodiments. For example, in the communication protocol defined by the IEEE 802.11 Standard, if the channel bandwidth is 20 Megahertz (MHz), the threshold level is −82 decibel-milliwatts (dBm) for energy from transmissions that conform to the IEEE 802.11 Standard (referred to as "valid 802.11" signals). For channel bandwidths of 40 MHz, 80 MHz, and 160 MHz, the threshold levels are −79 dBm, −76 dBm, and −73 dBm, respectively. For energy of signals not identified by the communication device as a valid 802.11 signal, the threshold level is −62 dBm, according to the IEEE 802.11 Standard.

In an embodiment, when a communication device (e.g., the AP 114 or a client station 154) determines that a primary channel is idle based on CCA/backoff operations performed in the primary channel, the communication device also checks one or more non-primary channels to determine whether the one or more non-primary channels can be utilized for transmission along with the primary channel. For example, in an embodiment, the communication device senses an energy level corresponding to the one or more non-primary channels for a predetermined length of time, such as a length of time corresponding to point coordination function (PCF) interframe space (PIFS) time period, immediately preceding expiration of the backoff timer corresponding to the primary channel. If detected energy level corresponding to one or more of the non-primary channels is below a threshold, the communication device determines that these one or more of the non-primary channels are also idle. When the backoff timer reaches zero, the communication device can transmit in a composite channel that includes the primary channel and the one or more non-primary channels determined to be idle, in an embodiment, in an embodiment.

In various embodiments, a bandwidth-limited client station 154 performs clear channel assessment operations, for example to determine whether the bandwidth-limited client station 154 can respond to a trigger frame (e.g., the trigger frame 406 of FIG. 4, the trigger frame 506 of FIG. 5 or another suitable trigger frame) for uplink transmission or can itself initiate an uplink transmission, based on the particular component channel in which the bandwidth-limited client station 154 is operating. For example, when the bandwidth-limited client station 154 is operating in the primary channel, the bandwidth-limited client station 154 sets its channel access timer (e.g., NAV) based on data units detected in the primary channel, in an embodiment. Similarly, the bandwidth-limited client station 154 operating in the primary channel performs backoff operations in the primary channel, in an embodiment. On the other hand, when the bandwidth-limited client station 154 is operating in a non-primary channel (e.g., a negotiated non-primary channel), the bandwidth-limited client station 154 sets its channel access timer (e.g., NAV) based on data units detected in the non-primary channel, in an embodiment. Similarly, the bandwidth-limited client station 154 operating in the non-primary channel performs backoff operations in the non-primary channel, in an embodiment.

In an embodiment, when a bandwidth-limited client station 154 switches its operation to a new component channel (e.g., from a primary channel to a non-primary channel or vice versa) and prior to transmission in the new component channel, the bandwidth-limited client station 154 performs clear channel assessment to determine whether the component channel is free to transmit. In an embodiment, when switching to a new component channel, the bandwidth-limited client station 154 initially sets its channel access timer (e.g., NAV) to a predetermined delay value, such as a NAVSYNCDELAY value. The bandwidth-limited client station 154 then begins to count down the channel access timer from the predetermined delay value. If before the channel access timer reaches zero the bandwidth-limited client station 154 detects a PHY data unit in the new component channel, the bandwidth-limited client station 154 resets the channel access timer to a new value determined based on duration information in a header or preamble of the PHY data unit, and begins to count down from the new value of the channel access timer. In any event, when the channel access timer reaches zero, the bandwidth-limited client station 154 performs a backoff operation corresponding to the new component channel, and determines based on the backoff operation whether the new component channel is clear for transmission, in an embodiment. Thus, when switching to a new component channel, the bandwidth-limited client station 154 can begin backoff upon expiration of a predetermined time period (e.g., NAVSYNCDELAY) or, if the client station 154 detects a PHY data unit in the new component channel, upon expiration of a time period corresponding to duration of the PHY data unit, in an embodiment.

In an embodiment, during a time period when a bandwidth-limited client station 154 is switching channels, such as switching from a primary component channel to a non-primary component channel or vice versa, the bandwidth-limited client station 154 is operating in power save mode. For example, prior to switching channels, the bandwidth-limited client station 154 informs the AP 114 that the client station is entering power save mode, in an embodiment. Subsequently, when the bandwidth-limited client station 154 completes transmission to the new component channel, the bandwidth-limited client station 154 informs the AP 114 that the client station is entering active mode. Accordingly, in an embodiment, the AP 114 will not transmit to the bandwidth-limited client station 154 in a new component channel until the bandwidth-limited client station 154 is ready for receiving in the new component channel. Power save mode operation of the bandwidth-limited client station 154 during the time period when the bandwidth-limited client station 154 is switching channels ensures that data units transmitted to the bandwidth-limited client station 154 will not be lost because the bandwidth-limited client station 154 is not ready to receive the data units in the new component channel, in an embodiment.

In some embodiments, the AP 114 and the client stations 154 are permitted to transmit data units in a non-primary channel of a communication channel, wherein the data units do not overlap a primary channel of the communication channel. In an embodiment, the AP 114 may determine that a non-primary channel in which a bandwidth-limited client station 154 is operating is idle and may transmit a data unit to the bandwidth-limited client station 154 in the non-primary channel even if the primary channel is busy, in an embodiment. Similarly, a bandwidth-limited client station 154 may determine that a non-primary channel in which the bandwidth-limited client station 154 is operating is idle and may transmit a data unit to the AP 114 in the non-primary channel even if the primary channel is busy, in an embodiment. As another example, the AP 114 may transmit an MU data unit to a plurality of client stations 154 in one or more non-primary channels that are determined to be idle even if the primary channel is busy and/or prompt a plurality of client stations 154 for MU transmission in one or more non-primary channels that are determined to be idle even if the primary channel is busy, in an embodiment.

Figure 7:
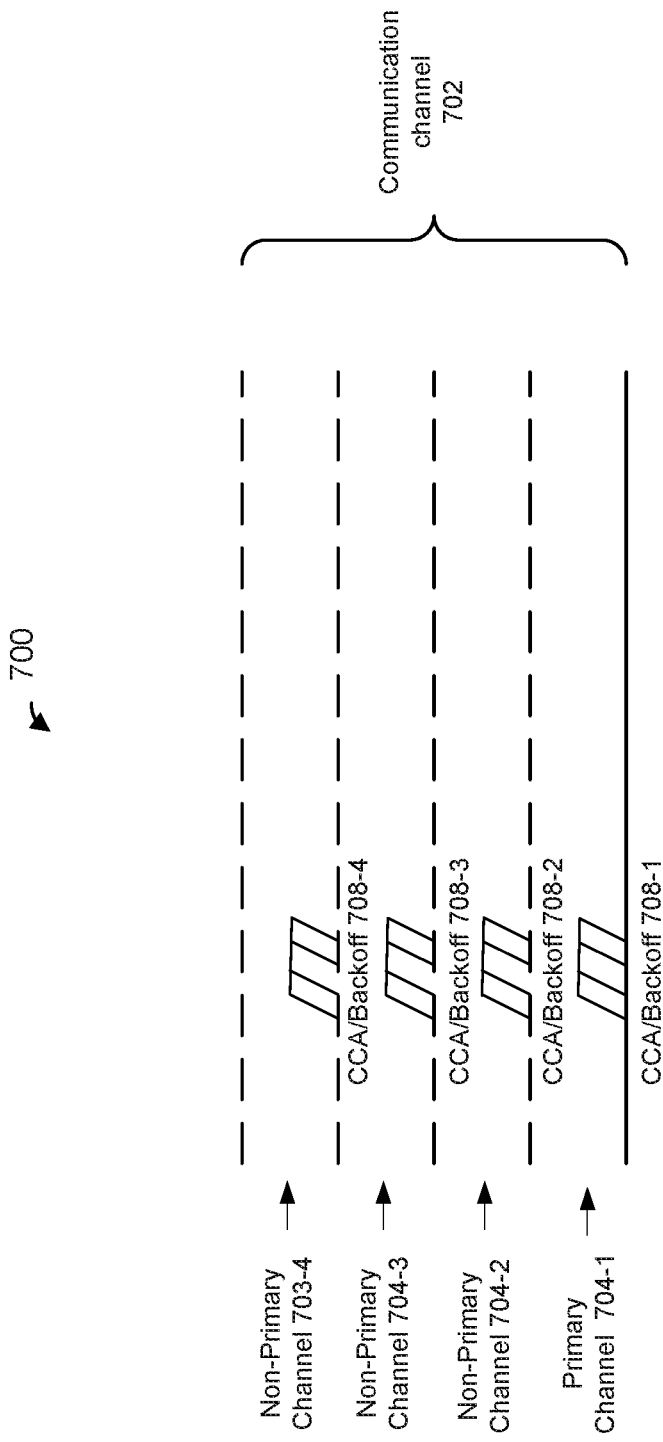
FIG. 7 is a block diagram of a procedure that a communication device is configured to implement to determine that one or more non-primary channels of a communication channel are idle even if a primary channel of the communication channel is busy, according to an embodiment.

FIG. 7 is a block diagram of a procedure 700 that a communication device is configured to implement to determine that one or more non-primary channels of a communication channel 702 are idle even if a primary channel of the communication channel 702 is busy, according to an embodiment. In an embodiment, the network interface 122 (e.g., partially the MAC processor 126 and partially the PHY processor 130) of the AP 114 is configured to implement the procedure 700. For ease of explanation, the procedure 700 is described with reference to the AP 114 of FIG. 1. In other embodiments, however, the procedure 700 is implemented by other suitable communication devices. For example, the procedure 700 is implemented by the network interface 162 (e.g., partially the MAC processor 166 and partially the PHY processor 170) of the client station 154-1 of FIG. 1, in an embodiment.

According to the procedure 700, the AP 114 performs respective CCA/backoff procedures corresponding to multiple ones (e.g., some or all) of component channels of the communication channel 702. In the embodiment of FIG. 7, the communication channel 702 includes four component channels 704, and the AP 114 is configured to perform respective CCA/backoff operations 708 corresponding to each the four component channels 704. In another embodiment, the AP 114 is configured to perform respective CCA/backoff operations 708 corresponding to some (e.g., two or three) but not all of the four component channels 704. In other embodiments, the communication channel 702 includes other suitable numbers of component channels (e.g., two, three, five, six, seven, etc.), and the AP 114 is configured to perform CCA/backoff operations 708 corresponding to multiple ones (e.g., some or all) of the other suitable number of component channels.

In an embodiment, the respective CCA/backoff operations 708 include maintaining respective NAV timers corresponding to respective ones of multiple component channels. The AP 114 is configured to set respective ones of the multiple NAV timers based on data units detected in the corresponding component channels, in an embodiment. Similarly, the respective CCA/backoff operations 708 include maintaining respective backoff timers corresponding to respective ones of the multiple component channels, in an embodiment. The AP 114 is configured to perform respective backoff operations in the respective ones of the multiple component channels using the respective backoff timers corresponding to the respective ones of the multiple component channels, in an embodiment.

The component channels 704 include a primary channel 704-1 and non-primary channels 704-2, 704-3 and 704-4, in an embodiment. The AP 114 is configured to perform CCA/backoff operations 708-1 corresponding to the primary channel 704-1, and to perform CCA/backoff operations 708-2, 708-3, 708-4 corresponding, respectively, to the non-primary channels 704-2, 704-3 and 704-4, in an embodiment. In an embodiment, the AP 114 is configured to transmit in one or more non-primary component channels 704-2, 704-3 and 704-4 determined to be idle by the respective CCA/backoff operations 708-2, 708-3, 708-4, even if the primary channel 704-1 is determined to be busy by the CCA/backoff operations 708-1. Thus, for example, when the AP 114 has data to transmit to a bandwidth-limited client station 154 that is operating in a non-primary channel (e.g., the non-primary channel 704-2), the AP 114 is configured to transmit the data in the non-primary channel 704-2 if the AP 114 determines based on the CCA/backoff operations 708-2 corresponding to the non-primary channel 704-2 that the non-primary channel 704-2 is idle even if the CCA/backoff operations 708-1 indicate that the primary channel 704-1 is busy, in an embodiment.

Figure 8:
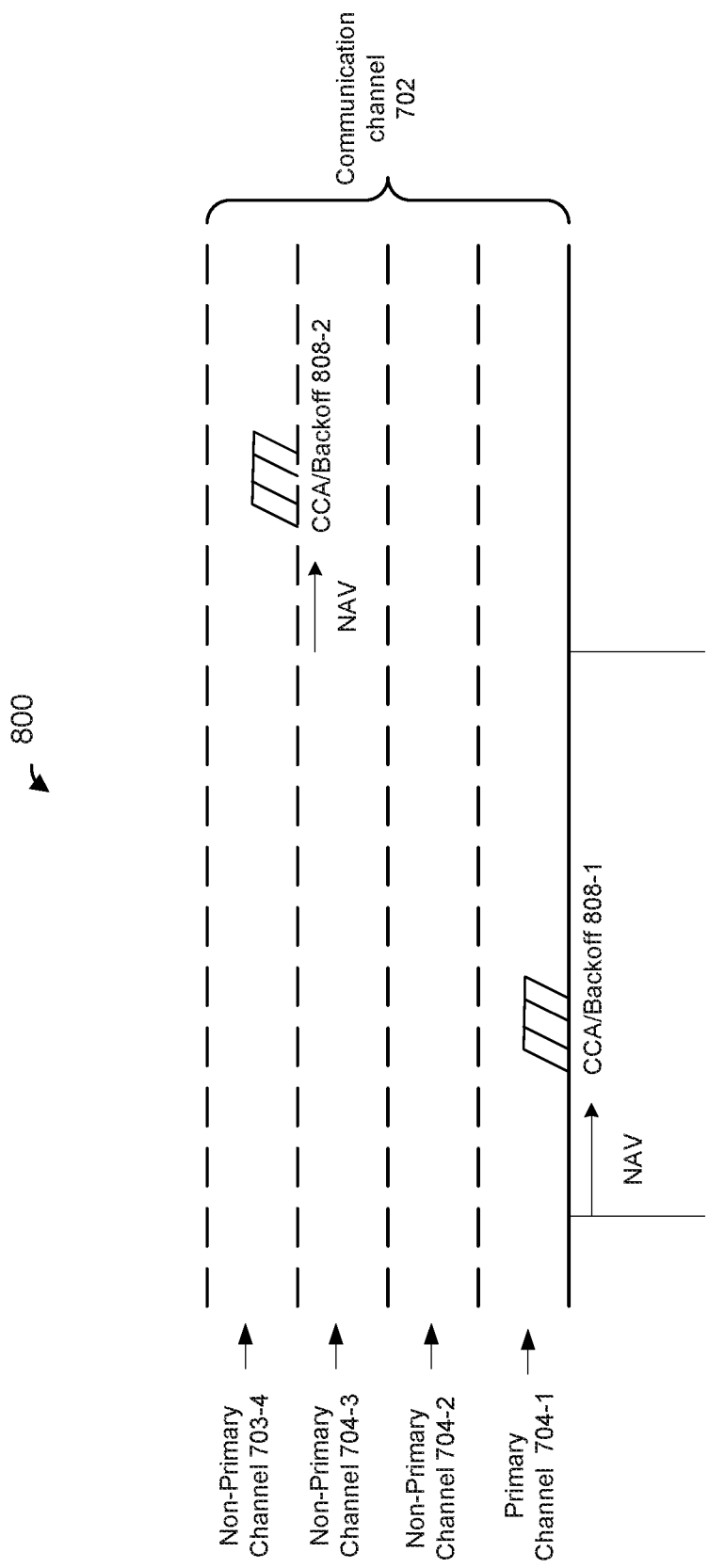
FIG. 8 is a block diagram of a procedure that a communication device is configured to implement to determine that one or more non-primary channels of a communication channel are idle even if a primary channel of the communication channel is busy, according to another embodiment.

FIG. 8 is a block diagram of a procedure 800 that a communication device is configured to implement to determine that one or more non-primary channels of a communication channel 702 are idle even if a primary channel of the communication channel 702 is busy, according to another embodiment. In an embodiment, the network interface 122 (e.g., partially the MAC processor 126 and partially the PHY processor 130) of the AP 114 is configured to implement the procedure 800. For ease of explanation, the procedure 800 is described with reference to the AP 114 of FIG. 1. In other embodiments, however, the procedure 800 is implemented by other suitable communication devices. For example, the procedure 800 is implemented by the network interface 162 (e.g., partially the MAC processor 166 and partially the PHY processor 170) of the client station 154-1 of FIG. 1, in an embodiment.

In an embodiment, according to the procedure 800, the AP 114 performs CCA/backoff operations 808 corresponding to a single component channel 704 at any given time, and the AP 114 performs the CCA/backoff operations 808 in different component channels 704 at different times. For example, in an embodiment, the AP 114 performs first CCA/backoff operations 808-1 corresponding to a first component channel 704, such as the primary channel 704-1. The first CCA/backoff operations 808-1 include determining whether first component channel 704 is idle or busy, in an embodiment. Additionally, the first CCA/backoff operations 808-1 include determining whether one or more other component channels 704 are idle and available for transmission along with the first component channel 704, in an embodiment. When the AP 114 determines that the first component channel 704 is idle and one or more other component channels 704 (if any) are idle and available for transmission along with the first component channel 704, the AP 114 transmits in the component channel 704-1 and the one or more other component channels (if any) that are determined to be idle based on the first CCA/backoff operations 808-1. After performing first CCA/backoff operations 808-1 corresponding to the first component channel 704, the AP 114 switches CCA/backoff operations 808 to a second component channel 704, such a non-primary channel 704-2, 704-3 or 704-4, and transmits in one or more component channel determined to be idle based on CCA/backoff operations 808-2 performed in the second component channel, in an embodiment.

In an embodiment, the AP 114 performs the first CCA/backoff operations 808-1 in connection with transmission during a first scheduled period (e.g., the SP 606-1 of FIG. 6) and switches the CCA/backoff operations to perform the CCA/backoff operations 808-2 in connection with transmission during a second scheduled period (e.g., the SP 606-1 of FIG. 6). In another embodiment, the AP 114 performs the first CCA/backoff operations 808-1 and the second CCA/backoff operations 808-2 at different times during a same scheduled period, or performs the first CCA/backoff operations 808-1 and the second CCA/backoff operations 808-2 in connection with transmissions performed not during scheduled periods.

In an example embodiment, the CCA/backoff operations 808-1 corresponding to the primary channel 704-1 indicate that the primary channel 704-1 and the non-primary component channels 704-2 and 704-4 are idle, but the non-primary component channel 704-3 is busy. Accordingly, the AP 114 transmits to one or more client stations 154 in the component channels 704-1, 704-2 and 704-4 and/or prompts transmission by one or more client stations 154 in the component channels 704-1, 704-2 and 704-4, in an embodiment. However, the AP 114 still has data to transmit in the component channel 704-3, for example to a bandwidth-limited client station 154 that is operating in the component channel 704-3, and/or the AP 114 wishes to prompt a transmission in the component channel 704-3, for example by a bandwidth-limited client station 154 that is operating in the component channel 704-3, in an embodiment. Accordingly, the AP 114 (e.g., after or during transmission in the component channels 704-1, 704-2 and 704-4) switches CCA/backoff operations 808 to the component channel 704-3, and performs to perform CCA/backoff operations 808-2 corresponding to the component channel 704-3, in an embodiment. When the AP 114 determines based on the CCA/backoff operations 808-2 that the component channel 704-3 is idle, the AP 114 transmits data to the bandwidth-limited client station 154 in the component channel 704-3, and/or prompts transmission by the bandwidth-limited client station 154 in the component channel 704-3, even if the primary channel 704-1 at that time is busy, in an embodiment.

In an embodiment, when the AP 114 switches CCA/backoff operations 808 to a new component channel (e.g., from the primary channel to a non-primary channel or vice versa), the AP 114 senses the communication medium in the new component channel for at least a predetermined delay time period, such as a NAVSYNCDELAY time period. For example, upon switching to the new component channel, the AP 114 initially sets its NAV to a predetermined value corresponding to the predetermined delay time period. If the AP 114 does not detect any transmissions (e.g., data units) in the new component channel during the predetermined time period (e.g., when NAV reaches zero), the AP 114 initiates backoff in the new component channel. On the other hand, if the AP 114 detects a transmission (e.g., a PHY data unit) in the new component channel during the during the predetermined time period (e.g., before NAV reaches zero), then the AP 114 resents its NAV based on the detected PHY data unit, in an embodiment. For example, the AP 114 resets its NAV based on duration information in a header or a preamble of the PHY data unit. The AP 114 then performs CCA/backoff operations using the reset NAV, in an embodiment. In an embodiment in which CCA/backoff operations are performed in connection with transmission during a scheduled period, at least a portion of the CCA/backoff operations may be performed outside of the scheduled period. For example, the AP 114 is configured to perform at least a portion of sensing a communication medium while counting down a NAV timer (e.g., at least a portion of the NAVSYNCDELAY time period) during a time period immediately preceding the scheduled period, in an embodiment.

In an embodiment, switching CCA/backoff operations 808 to a new component channel (e.g., from the primary channel to a non-primary channel or vice versa) includes determining backoff parameters (e.g., CW value, backoff timer value) to be utilized for performing backoff operations in the new component channel. In an embodiment, when the AP 114 switches CCA/backoff operations 808 to a new component channel, the AP 114 randomly or pseudo-randomly chooses an initial value for the backoff timer from the range of initial values [0, CW], where CWmin value is used for CW. In another embodiment, switching CCA/backoff operations 808 to a new component channel includes maintaining the backoff parameters used in the previous component channel. Thus, for example, after switching CCA/backoff operations 808 from the primary channel 704-1 to the non-primary channel 704-3, the AP 114 maintains the backoff parameters (e.g., CW value, backoff timer value) that were utilized in the primary channel 704-1 for performing backoff operations in the non-primary component channel 704-3, in an embodiment. In yet another embodiment, switching CCA/backoff operations 808 to a new component channel includes resuming CCA/backoff operations using the backoff parameters that were used in the new component channel when the CCA/backoff operations were last performed in the new component channel. For example, in an embodiment, a memory (e.g., one or more registers, one or more locations in a memory device (e.g., a random access memory (RAM), a flash memory, etc.) is used to store backoff parameters last used in respective ones of the component channels 704, and when the AP 114 switches to a new component channel 704 the AP 114 resumes backoff operation in the new component channel 704 using the backoff parameters stored in the memory for the new component channel 704, in an embodiment.

Figure 9:
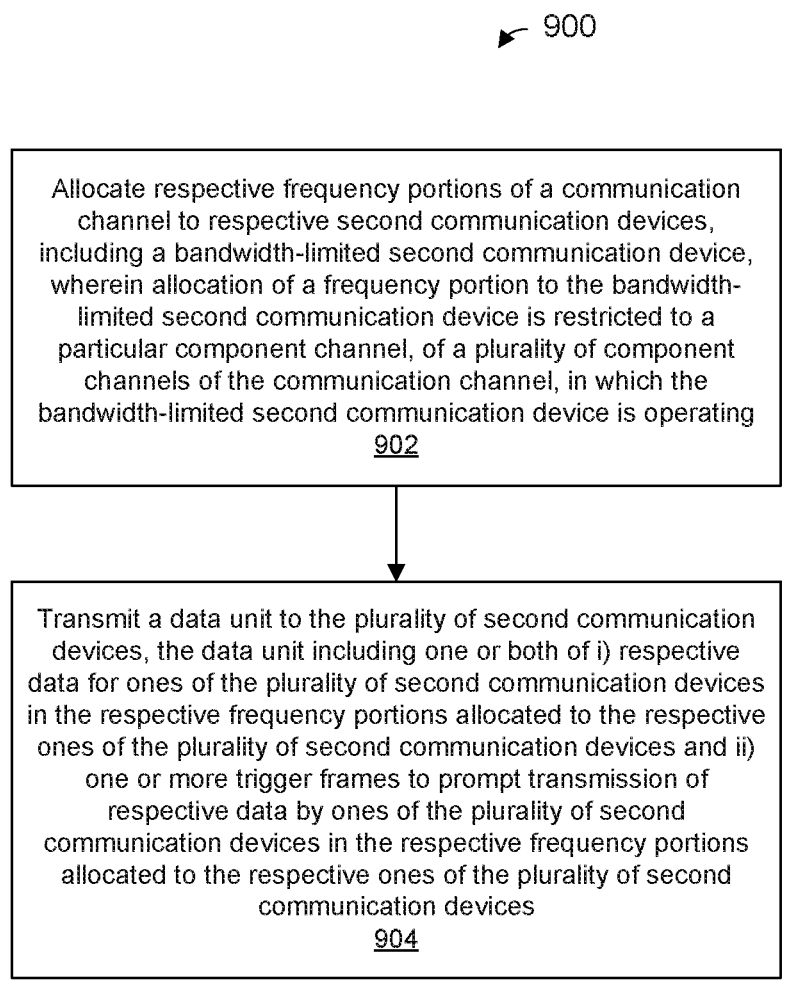
FIG. 9 is a flow diagram of an example method for operation of a first communication device in a communication channel that includes multiple component channels, according to an embodiment.

FIG. 9 is a flow diagram of an example method 900 for operation of a first communication device in a communication channel that includes multiple component channels, according to an embodiment. In an embodiment, the network interface 122 of the AP 114 of FIG. 1 is configured to implement the method 900. The method 900 is described in the context of the AP 114 merely for explanatory purposes and, in other embodiments, the method 900 is implemented by other suitable communication devices. For example, the network interface 122 of the AP 114 of FIG. 1 is configured to implement the method 800, in another embodiment.

At block 902, respective frequency portions of the communication channel are allocated to respective ones of a plurality of second communication devices. For example, the AP 114 allocates respective frequency portions of the communication channel to a plurality of client stations 154, in an embodiment. In an embodiment, the plurality of second communication devices includes a bandwidth-limited second communication device that is capable of operating with a maximum bandwidth that is less than a full bandwidth of the communication channel. For example, the plurality of client stations 154 includes a bandwidth-limited client station 154 that is capable of operating with a maximum bandwidth that is less than a full bandwidth of the communication channel, in an embodiment. In an embodiment, the bandwidth-limited second communication device is operating in a particular component channel of the plurality of component channels. For example, the bandwidth-limited second communication device is operating in a particular non-primary component channel of the communication channel as previously negotiated between the first communication device and the bandwidth-limited second communication device, in an embodiment. In another embodiment, the bandwidth-limited second communication device is operating in a primary component channel of the communication channel.

In an embodiment, allocating the respective frequency portions at block 902 includes allocating a frequency portion to the bandwidth-limited second communication device, wherein allocation of the frequency portion to the bandwidth-limited second communication device is restricted to the particular component channel in which the second communication device is operating. For example, in an embodiment in which the bandwidth-limited second communication device is operating in a particular (e.g., previously negotiated) non-primary channel of the communication channel, allocation of the frequency portion to the bandwidth-limited second communication device is restricted to the particular non-primary component channel of the communication channel. Thus, for example, the first communication device restricts allocation of the frequency portion to the bandwidth-limited second communication device to allocation of one or more RUs in the particular non-primary component channel, in an embodiment. As another example, in an embodiment in which the bandwidth-limited second communication device is operating in a primary component channel, allocation of the frequency portion to the bandwidth-limited second communication device is restricted to the primary component channel of the communication channel. Thus, for example, the first communication device restricts allocation of the frequency portion to the bandwidth-limited second communication device to allocation of one or more RUs in the primary component channel of the communication channel, in an embodiment.

At block 902, a first data unit is transmitted from the first communication device to the plurality of second communication devices. In an embodiment, the data unit includes one or both of i) respective data for ones of the plurality of second communication devices in the respective frequency portions allocated to the respective ones of the plurality of second communication devices and ii) one or more trigger frames to prompt transmission of respective data by ones of the plurality of second communication devices in the respective frequency portions allocated to the respective ones of the plurality of second communication devices. For example, the data unit 302 of FIG. 3 is transmitted from the first communication device to the plurality of second communication devices, in an embodiment. As another example, the data unit 402 of FIG. 4 is transmitted from the first communication device to the plurality of second communication devices, in another embodiment. As yet another example, the data unit 502 of FIG. 5 is transmitted from the first communication device to the plurality of second communication devices, in yet another embodiment. In another embodiment, another suitable data unit is transmitted from the first communication device to the plurality of second communication devices.

In an embodiment, a method includes allocating, at a first communication device to a plurality of second communication devices, respective portions of a communication channel that includes a plurality of component channels including i) at least one primary component channel and ii) one or more non-primary component channels, wherein the plurality of second communication devices includes a bandwidth-limited second communication device configured to operate with a maximum bandwidth that is less than a full bandwidth of the communication channel, wherein the bandwidth-limited second communication device is operating in a particular component channel of the plurality of component channels, and allocating the respective frequency portions includes allocating a frequency portion to the bandwidth-limited second communication device, wherein allocation of the frequency portion to the bandwidth-limited second communication device is restricted to the particular component channel in which the second bandwidth-limited communication device is operating. The method also includes transmitting, with the first communication device, a first data unit to the plurality of second communication devices, the first data unit including one or both of i) respective data for ones of the plurality of second communication devices in the respective frequency portions allocated to the respective ones of the plurality of second communication devices and ii) one or more trigger frames to prompt transmission of respective data by ones of the plurality of second communication devices in the respective frequency portions allocated to the respective ones of the plurality of second communication devices.

In other embodiments, the method comprises one of, or any suitable combination of two or more of, the following features.

The particular component channel is a particular non-primary component channel of the communication channel.

The one or more trigger frames comprise a trigger frame that is duplicated in each component channel of the plurality of component channels of the communication channel to allow the bandwidth-limited second communication device to receive the trigger frame in the particular non-primary component channel of the communication channel.

The particular component channel is previously negotiated between the first communication device and the bandwidth-limited second communication device.

The particular component channel previously negotiated between the first communication device and the bandwidth-limited second communication device is negotiated for operating during one or more scheduled time periods.

The method further comprises transmitting, with the first communication device at a time outside the one or more scheduled time periods, a second data unit that includes data for the bandwidth-limited second communication device in a primary component channel of the component channel.

The method further comprises generating, with the first communication device, a management frame for transmission in the communication channel, wherein the management frame is duplicated in each of the plurality of component channels of the communication channel, and transmitting, with the first communication device, the management frame duplicated in each of the plurality of component channels of the communication channel to allow the bandwidth-limited second communication device operating in a non-primary component channel of the communication channel to receive the management frame in the non-primary component channel.

The management frame is a beacon frame.

The method further comprises, prior to transmitting the first data unit, performing, at the first communication device, respective backoff procedures corresponding to multiple ones the component channels to determine whether respective ones of the multiple component channels are idle, and transmitting the first data unit comprises transmitting the first data unit only in component channels that are determined to be idle based on the respective backoff procedures performed in the multiple ones of the component channels.

The method further comprises: prior to transmitting the first data unit, performing, at the first communication device, a first backoff procedure corresponding to a first component channel to determine whether one or more component channels of the plurality of component channels are idle; transmitting the first data unit i) only if the first component channel is determined to be idle and ii) only in the one or more component channels determined to be idle based on the first backoff procedure; subsequent to the first backoff procedure, performing, at the first communication device, a second backoff procedure corresponding to a second component channel of the plurality of component channels, the second component channel being a component channel other than the first component channel; and transmitting, with the first communication device to one or more of the second communication devices, a second data unit in the one or more component channels determined to be idle based on the second backoff procedure.

Performing the second backoff procedure corresponding to the second communication channel comprises performing the second backoff procedure using one of i) backoff parameters carried over from the first backoff procedure corresponding to the first component channel, ii) backoff parameters resumed from a backoff procedure previously performed corresponding to the second communication channel, and iii) newly selected backoff parameters for performing the second backoff procedure corresponding to the second communication channel.

In another embodiment, an apparatus comprises a first network interface device associated with a first communication device, wherein the first network interface device comprises one or more integrated circuit (IC) devices configured to allocate, to a plurality of second communication devices, respective portions of a communication channel that includes a plurality of component channels including i) at least one primary component channel and ii) one or more non-primary component channels, wherein the plurality of second communication devices includes a bandwidth-limited second communication device configured to operate with a maximum bandwidth that is less than a full bandwidth of the communication channel, wherein the bandwidth-limited second communication device is operating in a particular component channel of the plurality of component channels, and allocating the respective frequency portions includes allocating a frequency portion to the bandwidth-limited second communication device, wherein allocation of the frequency portion to the bandwidth-limited second communication device is restricted to the particular component channel in which the bandwidth-limited second communication device is operating. The one or more IC devices are also configured to transmit a first data unit to the plurality of second communication devices, the first data unit including one or both of i) respective data for ones of the plurality of second communication devices in the respective frequency portions allocated to the respective ones of the plurality of second communication devices and ii) one or more trigger frames to prompt transmission of respective data by ones of the plurality of second communication devices in the respective frequency portions allocated to the respective ones of the plurality of second communication devices.

In other embodiments, the apparatus comprises one of, or any suitable combination of two or more of, the following features.

The particular component channel is a particular non-primary component channel of the communication channel.

The one or more trigger frames comprise a trigger frame that is duplicated in each component channel of the plurality of component channels of the communication channel to allow the bandwidth-limited second communication device to receive the trigger frame in the particular non-primary component channel of the communication channel.

The particular component channel is previously negotiated between the first communication device and the bandwidth-limited second communication device.

The particular component channel previously negotiated between the first communication device and the bandwidth-limited second communication device is negotiated for operating during one or more scheduled time periods, and the one or more IC devices are further configured to transmit, at a time outside the one or more scheduled time periods, a second data unit that includes data for the bandwidth-limited second communication device in a primary component channel of the component channel.

The one or more IC devices are further configured to: generate a management frame for transmission in the communication channel, wherein the management frame is duplicated in each of the plurality of component channels of the communication channel, and transmit the management frame duplicated in each of the plurality of component channels of the communication channel to allow the bandwidth-limited second communication device operating in a non-primary component channel of the communication channel to receive the management frame in the non-primary component channel.

The management frame is a beacon frame.

The one or more IC devices are further configured to: prior to transmitting the first data unit, perform respective backoff procedures corresponding to multiple ones the component channels to determine whether respective ones of the multiple component channels are idle, and transmit the first data unit only in component channels that are determined to be idle based on the respective backoff procedures performed in the multiple ones of the component channels.

The one or more IC devices are further configured to: prior to transmitting the first data unit, perform a first backoff procedure corresponding to a first component channel to determine whether one or more component channels of the plurality of component channels are idle, transmit the first data unit i) only if the first component channel is determined to be idle and ii) only in the one or more component channels determined to be idle based on the first backoff procedure, subsequent to the first backoff procedure, perform a second backoff procedure corresponding to a second component channel of the plurality of component channels, the second component channel being a component channel other than the first component channel, and transmit, to one or more of the second communication devices, a second data unit in the one or more component channels determined to be idle based on the second backoff procedure.

Performing the second backoff procedure corresponding to the second communication channel comprises performing the second backoff procedure using one of i) backoff parameters carried over from the first backoff procedure corresponding to the first component channel, ii) backoff parameters resumed from a backoff procedure previously performed corresponding to the second communication channel, and iii) newly selected backoff parameters for performing the second backoff procedure corresponding to the second communication channel.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:

allocating, at a first communication device to a plurality of second communication devices, respective portions of a communication channel that includes a plurality of component channels including i) at least one primary component channel and ii) one or more non-primary component channels, wherein the plurality of second communication devices includes a bandwidth-limited second communication device configured to operate with a maximum bandwidth that is less than a full bandwidth of the communication channel, wherein the bandwidth-limited second communication device is expected to operate in a particular non-primary component channel, among the one or more non-primary component channels, during a target wake time (TWT) period negotiated between the first communication device and the bandwidth-limited second communication device, and allocating the respective frequency portions includes allocating a frequency portion to the bandwidth-limited second communication device, wherein allocation of the frequency portion to the bandwidth-limited second communication device is restricted to the particular non-primary component channel in which the second bandwidth-limited communication device is expected to operate during the TWT period negotiated between the first communication device and the bandwidth-limited second communication device;

transmitting, with the first communication device during the TWT period, a first data unit to the plurality of second communication devices, the first data unit including one or both of i) respective data for ones of the plurality of second communication devices in the respective frequency portions allocated to the respective ones of the plurality of second communication devices and ii) one or more trigger frames to prompt transmission of respective data by ones of the plurality of second communication devices in the respective frequency portions allocated to the respective ones of the plurality of second communication devices, wherein the bandwidth-limited second communication device is expected to switch between i) operating in the particular non-primary component channel during the TWT period and ii) operating in the primary component channel outside of the TWT period;

generating, at the first communication device, a beacon frame for transmission in the communication channel;

including, at the first communication device, the beacon frame in each of a plurality of legacy packets; and transmitting, with the first communication device, the plurality of legacy packets in respective component channels of the communication channel to allow the bandwidth-limited second communication device operating in a particular non-primary component channel of the communication channel to receive and process the beacon frame in the non-primary component channel.

2. The method of claim 1, wherein the particular component channel is the particular non-primary component channel of the communication channel.

3. The method of claim 2, wherein the one or more trigger frames comprise a trigger frame that is duplicated in each component channel of the plurality of component channels of the communication channel to allow the bandwidth-limited second communication device to receive the trigger frame in the particular non-primary component channel of the communication channel.

4. The method of claim 1, further comprising transmitting, with the first communication device at a time outside the TWT period, a second data unit that includes data for the bandwidth-limited second communication device in the primary component channel of the component channel.

5. The method of claim 1, wherein:

the method further comprises, prior to transmitting the first data unit, performing, at the first communication device, respective backoff procedures corresponding to multiple ones the component channels to determine whether respective ones of the multiple component channels are idle; and transmitting the first data unit comprises transmitting the first data unit only in component channels that are determined to be idle based on the respective backoff procedures performed in the multiple ones of the component channels.

6. The method of claim 1, wherein the method further comprises:

prior to transmitting the first data unit, performing, at the first communication device, a first backoff procedure corresponding to a first component channel to determine whether one or more component channels of the plurality of component channels are idle;

transmitting the first data unit i) only if the first component channel is determined to be idle and ii) only in the one or more component channels determined to be idle based on the first backoff procedure;

subsequent to the first backoff procedure, performing, at the first communication device, a second backoff procedure corresponding to a second component channel of the plurality of component channels, the second component channel being a component channel other than the first component channel; and transmitting, with the first communication device to one or more of the second communication devices, a second data unit in the one or more component channels determined to be idle based on the second backoff procedure.

7. The method of claim 6, wherein performing the second backoff procedure corresponding to the second communication channel comprises performing the second backoff procedure using one of i) backoff parameters carried over from the first backoff procedure corresponding to the first component channel, ii) backoff parameters resumed from a backoff procedure previously performed corresponding to the second communication channel, and iii) newly selected backoff parameters for performing the second backoff procedure corresponding to the second communication channel.

8. An apparatus, comprising:

a first network interface device associated with a first communication device, wherein the first network interface device comprises one or more integrated circuit (IC) devices configured to:

allocate, to a plurality of second communication devices, respective portions of a communication channel that includes a plurality of component channels including i) at least one primary component channel and ii) one or more non-primary component channels, wherein the plurality of second communication devices includes a bandwidth-limited second communication device configured to operate with a maximum bandwidth that is less than a full bandwidth of the communication channel, wherein the bandwidth-limited second communication device is expected to operate in a particular non-primary component channel, among the one or more non-primary component channels, during a target wake time (TWT) period negotiated between the first communication device and the bandwidth-limited second communication device, and allocating the respective frequency portions includes allocating a frequency portion to the bandwidth-limited second communication device, wherein allocation of the frequency portion to the bandwidth-limited second communication device is restricted to the particular non-primary component channel in which the second bandwidth-limited communication device is expected to operate during the TWT period negotiated between the first communication device and the particular second communication device;

wherein the one or more IC devices are further configured to:

transmit, during the TWT period, a first data unit to the plurality of second communication devices, the first data unit including one or both of i) respective data for ones of the plurality of second communication devices in the respective frequency portions allocated to the respective ones of the plurality of second communication devices and ii) one or more trigger frames to prompt transmission of respective data by ones of the plurality of second communication devices in the respective frequency portions allocated to the respective ones of the plurality of second communication devices, wherein the bandwidth-limited second communication device is expected to switch between i) operating in the particular non-primary component channel during the TWT period and ii) operating in the primary component channel outside of the TWT period, generate a beacon frame for transmission in the communication channel, include the beacon frame in each of a plurality of legacy packets, and transmit the plurality of legacy packets in respective component channels of the communication channel to allow the bandwidth-limited second communication device operating in a particular non-primary component channel of the communication channel to receive and process the beacon frame in the non-primary component channel.

9. The apparatus of claim 8, wherein the particular component channel is the particular non-primary component channel of the communication channel.

10. The apparatus of claim 9, wherein the one or more trigger frames comprise a trigger frame that is duplicated in each component channel of the plurality of component channels of the communication channel to allow the bandwidth-limited second communication device to receive the trigger frame in the particular non-primary component channel of the communication channel.

11. The apparatus of claim 8, wherein the one or more IC devices are further configured to transmit, at a time outside the TWT period, a second data unit that includes data for the bandwidth-limited second communication device in the primary component channel of the component channel.

12. The apparatus of claim 8, wherein the one or more IC devices are further configured to:

prior to transmitting the first data unit, perform respective backoff procedures corresponding to multiple ones the component channels to determine whether respective ones of the multiple component channels are idle; and transmit the first data unit only in component channels that are determined to be idle based on the respective backoff procedures performed in the multiple ones of the component channels.

13. The apparatus of claim 8, wherein the one or more IC devices are further configured to:

prior to transmitting the first data unit, perform a first backoff procedure corresponding to a first component channel to determine whether one or more component channels of the plurality of component channels are idle;

transmit the first data unit i) only if the first component channel is determined to be idle and ii) only in the one or more component channels determined to be idle based on the first backoff procedure;

subsequent to the first backoff procedure, perform a second backoff procedure corresponding to a second component channel of the plurality of component channels, the second component channel being a component channel other than the first component channel; and transmit, to one or more of the second communication devices, a second data unit in the one or more component channels determined to be idle based on the second backoff procedure.

14. The apparatus of claim 13, wherein performing the second backoff procedure corresponding to the second communication channel comprises performing the second backoff procedure using one of i) backoff parameters carried over from the first backoff procedure corresponding to the first component channel, ii) backoff parameters resumed from a backoff procedure previously performed corresponding to the second communication channel, and iii) newly selected backoff parameters for performing the second backoff procedure corresponding to the second communication channel.

* * * * *